June 3, 1952 — R. H. ANDERSON — 2,599,037
QUICK DISMOUNTABLE COWLING
Filed July 26, 1947 — 4 Sheets-Sheet 3
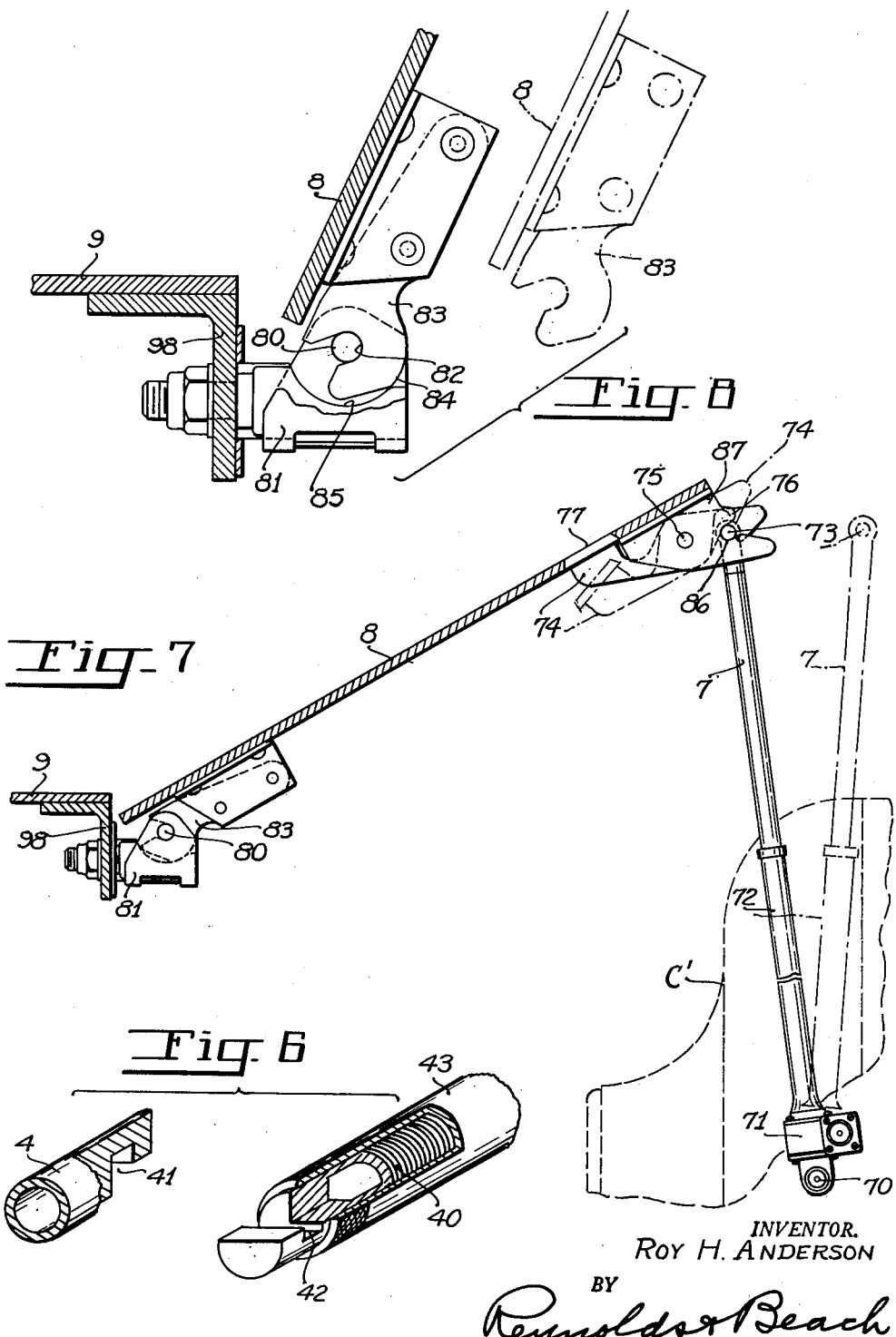
INVENTOR.
ROY H. ANDERSON
BY
Reynolds & Beach
ATTORNEYS Inventor
Roy H. Anderson
By Reynolds + Beach
Attorneys Patented June 3, 1952

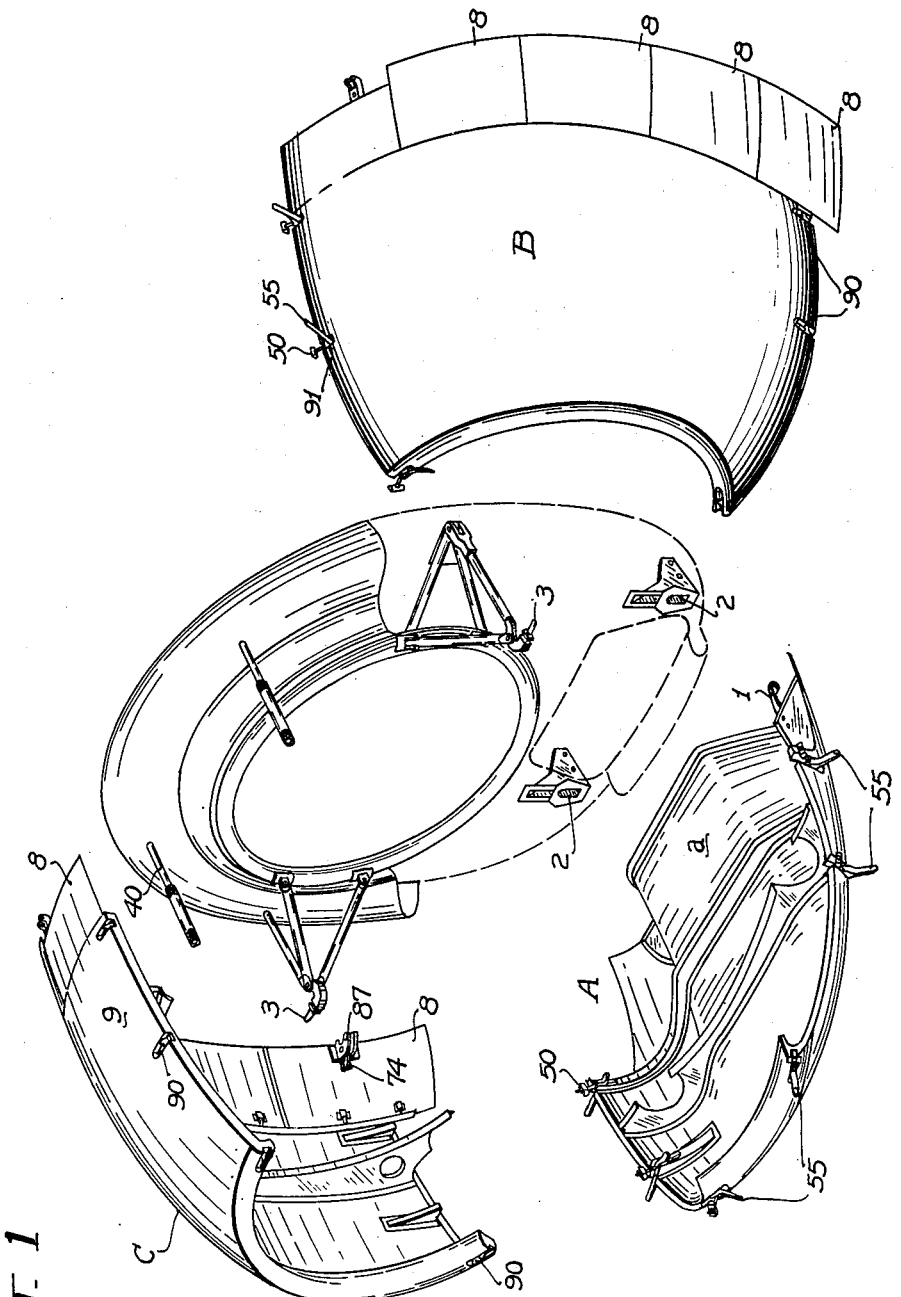

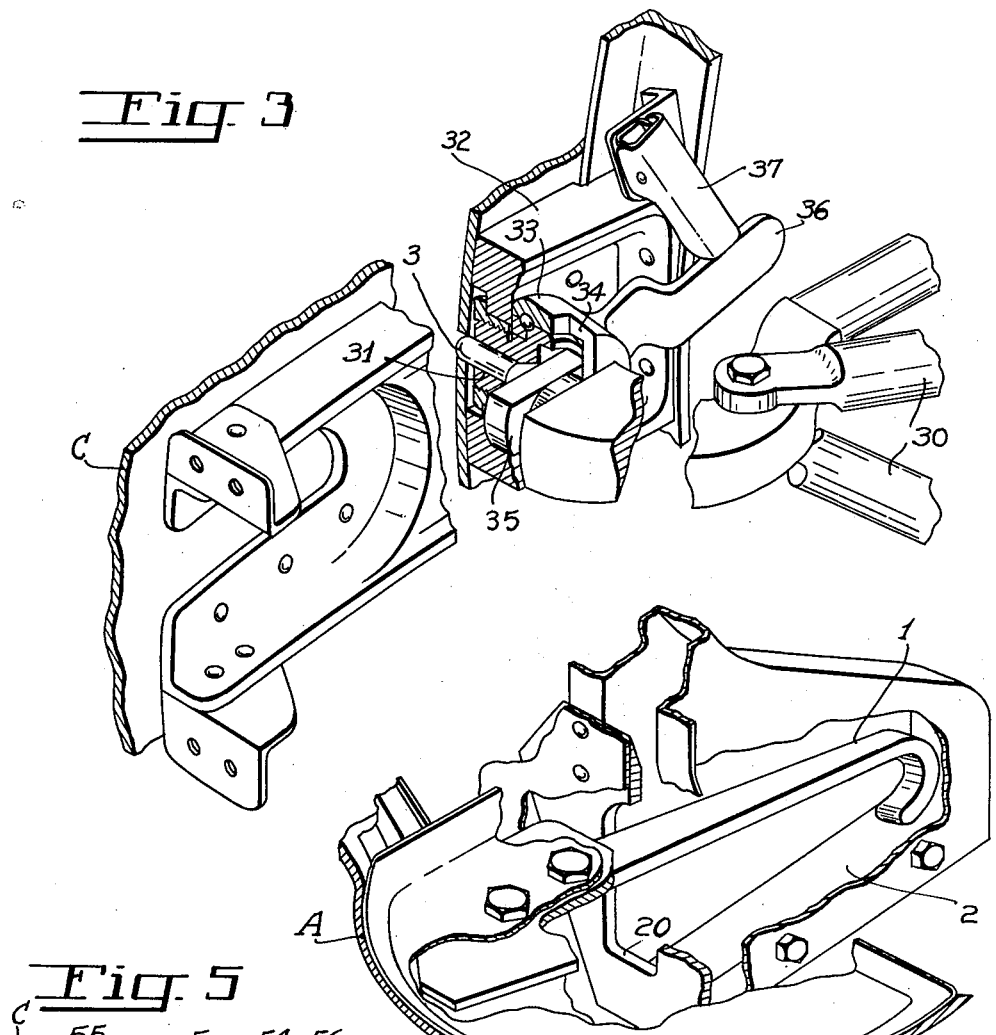
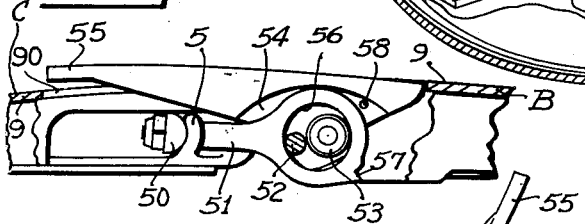
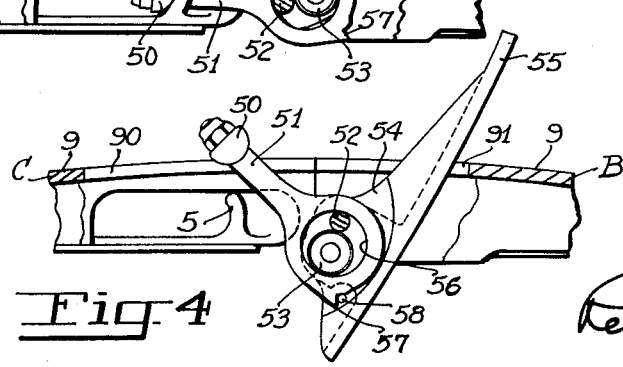

2,599,037

UNITED STATES PATENT OFFICE 2,599,037

QUICK-DISMOUNTABLE COWLING

Roy H. Anderson, Seattle, Wash., assignor to Boeing Airplane Company, a corporation of Delaware Application July 26, 1947, Serial No. 763,833

20 Claims. (Cl. 123—41.59)

The present invention concerns a ring cowling such as is commonly used about the radial air-cooled engines of aircraft. Such cowlings are sometimes used about other elements of the aircraft, but since their use as an engine cowling is the most common one, this use will be taken as illustrative, and will be the only use hereinafter referred to.

Such engines must be frequently worked upon, and generally this requires the removal or dismounting of the cowling. Ordinarily this has been a comparatively difficult, lengthy, and tedious task, for the cowling, spaced outwardly from the engine which supports it, is subjected to the full force of the relative air and, as well, to various vibrational forces and others generated by the engine, and it must be very securely supported to resist such forces. The problem is complicated, moreover, by the common use of sectional flaps at the trailing edge of the cowling, which are adjustable inwardly and outwardly to vary the cooling effect through the cowling. Each such flap section must be disconnected from its actuator and later reconnected thereto when the cowling is again mounted; the connections of each flap to its supporting cowl segment, and of each actuator to its flap section, must be secure against the possibility of accidental disconnection, hence disconnection when desired is not readily accomplished.

It is the primary object of the present invention to provide a ring cowling construction and mounting means therefor by which the dismounting of the cowling can be quickly and easily accomplished, and its remounting as well, by a minimum number of workmen, in an installation wherein the mountings are as secure as in the less readily dismountable installation referred to above. Thereby many hours of unnecessary labor may be saved during required servicing operations, and, because they can be accomplished easily and at the expense of but little time, and with few men, minor or casual inspections or adjustment that might ordinarily be postponed are accomplished as and when they come to attention. Efficiency and safety are thus promoted.

More specifically, the invention aims at the provision of a segmental cowling wherein three or more cowl segments are each so constructed and mounted that by means normally of not more than two supports it may be held relative to the engine against axial or circumferential movement, and so held, under servicing conditions, even though the several segments be completely disconnected one from another. Yet since this sort of mounting, unless provided with means to prevent radial movement of the cowling segments, would be impracticable in flight, it is a further object to provide in such an installation means which connect and urge the several segments together, to the end that they will mutually resist radial separation from their mounts. All such connecting and mounting means are of quick detachable nature, whereby the several segments may readily be disconnected one from another, for removal of one alone or for removal of all in order that work may be done on all parts of the engine.

It is also an object to provide such an installation which in itself, and in its various connections and mountings, will not rattle or produce stresses upon the cowl mounts or in the engine mount ring whereon the cowl is supported, other than such as are inherent in all ring cowls and their mounts.

It is also an object to provide in such a ring cowl flap mounting means and actuator connecting means which will permit ready separation of the cowl flaps from their respective actuators, and, when necessary, of the cowl flaps from cowl segments whereon they are mounted.

It is further an object to provide in such a quick-dismountable ring cowling, supporting structures therefor which are simple yet effective in operation, and which to the extent necessary will be locked or self-locking in their secured positions, thereby to minimize the possibility of accident from carelessness. Accessibility of such locking means is necessary, and it is a further object to design and locate them for maximum accessibility, yet in such manner that they produce a minimum, if any, additional, drag. Some thereof, located in the skin of the cowl, will only be locked when they lie flush with such skin.

With these objects in mind, and others as will appear more fully hereinafter, the invention comprises the novel ring cowling as a whole, the novel parts thereof, and the novel accessories thereto, all as hereinafter shown, and in the arrangement and relationship hereinafter described more fully.

In the accompanying drawings the invention is shown in a typical form applied to a ring cowling formed to accommodate an air scoop at its lowest point.

Figure 1 is an exploded view of the cowling, its supports and associated parts.

Figure 2 is a perspective view, broken away, of a detail of one of the segmental mounts, and Figure 3 is a similar view of a different type of mount.

Figure 4 is a sectional view, with parts disengaged, and Figure 5 is a similar sectional view with parts nearly fully engaged, showing the constrictive means for holding together adjoining segments.

Figure 6 is a perspective view of axially directed supporting and connecting means between the cowl segments and the engine mount ring.

Figure 7 is a longitudinal sectional view showing the trailing edge of a ring cowl segment and an associated flap actuator, illustrating the manner of disengaging the actuator from the flap, and Figure 8 is a similar view, somewhat enlarged, showing the manner of disengaging the flap from its supporting cowl segment.

Figure 9:
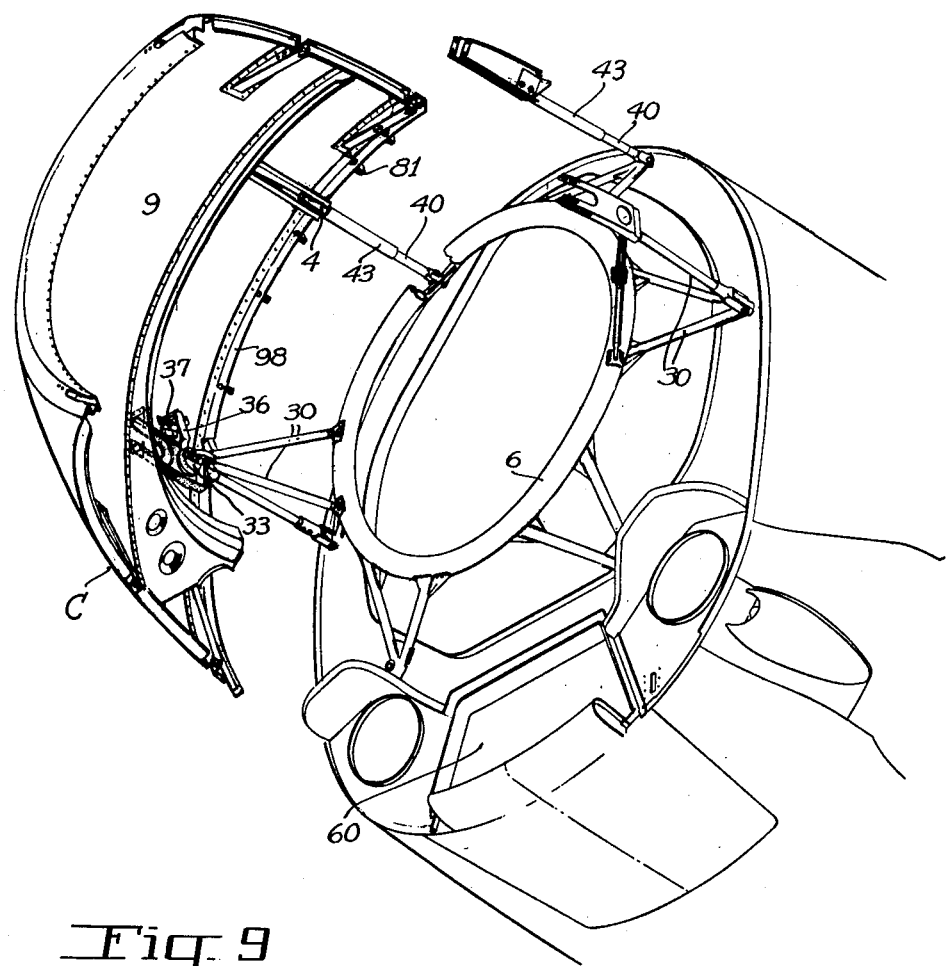
Figure 9 is a perspective view, from below, of one cowl segment, its mounts, and the engine mount ring which supports the latter.

The engine, its baffling, the engine mount ring, and various associated parts have been shown herein only sketchily, but since these elements are well known, as also is their relationship to the ring cowling, it is believed that no further showing is necessary. In Figure 1 the ring cowl is shown dismounted from, but in correct position relationship to mounting means which are mounted upon the engine mount ring, whereas in Figure 9 one segment of the ring cowl is shown mounted upon the engine mount 6. The ring cowl itself is illustrated as divided into three segments, the lower segment A and two lateral segments B and C, which are substantial opposites of one another. It is not essential that the ring cowl be divided only into three segments, but it is convenient that the lower segment A extend substantially equally at opposite sides of a vertical plane through the axis of the engine, and that the remaining segments be substantially balanced at opposite sides of that vertical axial plane. The segment A is shown as indented at $a$, to accommodate or to form the intake of an air scoop 60, which is not uncommonly so located in conjunction with such engines. The three segments A, B, and C, when connected and joined tightly together, constitute a substantially smooth and homogeneous ring cowl which surrounds the engine and is itself mounted upon the engine mount.

The segment A, like the other segments, is provided with supporting means whereby it is supported from the engine, when the entire ring cowl is assembled, to oppose at least circumferential movement relative to the engine, and to a degree, at least, to oppose also movement axially with respect to the engine. However, differing from the segments B and C, the segment A is preferably mounted in such manner that it may swing downwardly to clear the engine while still remaining supported from its mount. To this end the cowl segment A is provided with rearwardly and downwardly directed hooks 1 (see Figures 1 and 2), which are receivable within forwardly opening sockets 2 fixedly mounted upon the engine mount ring or to some element which is rigid therewith. Each such socket has an upstanding lip 20 (see Figure 2), and if at any time the lower segment A lacks other support, it may hinge downwardly, its hooks 10 catching in the lip 20, to serve as hinge means for downward swinging of the segment A. Thereby this segment A is prevented from falling, though the segments B and C be removed, and there be no helper to catch and support, or remove, the segment A.

The further means for supporting the segment A are those means, to be described later, by which the segment A is secured to the two adjoining segments B and C, respectively.

Each of the lateral segments B and C is supported similarly to the other. Primarily to prevent relative rotational movement of the segment with respect to the engine mounting, a laterally projecting pintle 3 is supported from the mount ring 6, as by means of the braced structure 30, or in any other suitable fashion, in position to be received within a complemental socket 31, which is carried by the fittings 32 on the interior of the cowl segments. In effect a part of the socket, but actually rotative with respect to it, is a transversely notched collar 33, in the notch 34 whereof is receivable a cross or T head 35, which is mounted rigidly upon the pintle 3. When the collar 33 is rotated so that its notch 34 registers with the T head 35, the pintle 3 may be received fully within the socket 31, whereupon, by rotation of the collar 33, for instance through 90°, into the position shown in Figure 3, the T head 35 is locked in position, and the pintle 3 cannot be withdrawn from its socket 31. Such rotation is accomplished by means of the handle 36, and this handle is locked in such position by the spring-urged locking dog 37, which is mounted within the cowling segment.

In addition to locking the lateral segment against rotational movement relative to the engine mount ring 6, this mount, to a certain degree, prevents relative axial movement of the cowl segment with respect to the mount ring, and radial separation of the cowl segment from the mount ring. Nevertheless it is preferable that further means to these two ends be provided, and also it is desirable that each cowl segment be supported from the engine mount ring at at least two points, so that to a limited degree, at least, it is self-supported upon the engine mount, independently of all other segments and their securing means, and can be dismounted therefrom independently of the other segments. Such additional securing means are shown in detail in Figure 6, and in assembled relationship in Figure 9, and consists of two axially directed, aligned rods or pins, 4 upon the inner side of the cowl segment and 40 upon the engine mount ring. These are provided at their ends with complemental hooks 41 and 42, lying wholly within the cylindrical outline of the respective pins. These two pins are of substantially the same diametral size, and the junction between them, when the hooks 41 and 42 are engaged, is shrouded or spanned by a sleeve 43, which is spring-pressed in a sense to cause it to enclose the hook portion 42 of the pin 40 which carries it. In Figure 6 it is shown withdrawn, in opposition to the spring force, but upon release of the sleeve 43, the hooks having been engaged, the sleeve will slide down over the joined hooks, as shown in Figure 9, and prevent their disengagement. This automatically locks parts in the engaged position against accidental separation, just as the rotation of the collar or cup 32 and its locking by the locking dog 37 prevents separation of this support.

The supports at 3, 31 and at 41, 42 are quickly disengageable and reengageable, and are adequate for support of each segment A or B under servicing conditions, but are not of themselves of such nature as will sufficiently securely hold the cowl segments against all forces applied to the individual cowl segments during flight, except as they gain added support by making the cowl ring one homogeneous piece, in which case all the various securing means for the segments mutually assist in the support of the cowl ring as a whole. Accordingly means are provided for securing together all these cowl segments across their adjoining axially extending edges, and these means preferably include mechanism for constricting the ring as a whole and for drawing its segments closely together, and for holding them so drawn together against rattling and separation.

Securing means suitable to this end are shown in detail in Figures 4 and 5. Upon one cowl segment, for instance upon the segment C, is secured a hook 5, disposed somewhat beneath the skin 9 of the cowl ring. Engageable with the hook 5 through a narrow aperture or slot 90 in the skin is a T head 50 upon the end of an arm 51, which through its support and operating means is in effect cammed for movement away from the hook 5. Conveniently, the arm 51 is pivotally mounted eccentrically of a fixed pivot pin 52, which is on the opposite segment B. The camming or eccentric arrangement may be in the nature of a roller 53, carried by a bracket 54 on the under side of a locking lever or actuator 55, the roller rolling in a larger circle 56 at the end of the arm 59. The arm 59 is provided also with a radially directed shoulder 57, and the actuator 55 is provided with a pin 58 which at the proper time will engage the shoulder 57, to effect raising of the T head 50 from engagement with the hook 5 in the process of unlocking, but which, as the actuator 55 swings downwardly in locking, will separate from the shoulder 57 to permit relative rotational movement between the arm 51 and the actuator 55. Comparison between Figures 4 and 5 will make this clear. The actuator 55 is preferably mounted to swing through a slot or recess 91 in the skin 9 of the segment B, and is so shaped that in locking position, which it has nearly reached in Figure 5, it will substantially fill the two apertures 90 and 91, and lie flush with the skin 9 in both segments. Thus the actuator 55 is readily accessible, but does not leave any projection to increase drag. Moreover, it acts as a key to prevent relative vibration of the segments in the axial sense.

As will be understood, the segment A may be mounted by engaging its hooks within the socket 2, and left to hang downwardly. The segments B and C are then each supported in turn in position about the engine by engagement of the pintles 3 within their sockets 31, and by the interengagement of the hooks 41 and 42. At this time the locks at 5, 50 across the upper joint between the segments B and C may be connected, and then the segment A may be swung upwardly and similarly connected to the segments B and C. The constrictive action of the locking means at 5, 50 will serve to draw the ring cowl as a whole tightly toward the engine and down upon its supports, and will tightly bind together the several segments into a homogeneous ring cowl, capable of vibrational movement as a unit, all parts of which mutually support all other parts. When it is desired to remove the ring cowl, any segment may be removed without removal of any other segment, or all can quickly be removed in succession. The first operation to effect removal is to swing outwardly the actuators 55, which slacks off the interengagement at 5, 50, and at the proper time the pin 58 engages the shoulder 57 and swings the T head 50 upwardly from engagement with the hook 5. The segment A may now hang downwardly, when released from the segments B and C, and each lateral segment may be removed by withdrawing the sleeve 43 and disengaging the hooks 41 and 42, and by swinging aside the locking dog 37, permitting rotation of the handle 36 and its collar or socket part 33, until the T head 35 and pintle 3 may be withdrawn from the socket 31, 34.

Were the ring cowl to have no adjustable flaps at its trailing edge, the operation above would constitute a very simple and effective means of quickly dismounting the ring cowl. However, most such engines, at least on the larger airplanes, are provided with flaps on the trailing edge of each ring cowl, which swing inwardly or outwardly to vary the cooling effect through the ring cowl. It would be futile to provide quick-dismountable means for the ring cowl itself if it were not possible at the same time to quickly disengage each flap section from its individual actuator. The means to this end are shown in detail in Figures 7 and 8.

There will usually be a plurality of individual flaps 8 at the trailing edge of each cowl segment. Five such flap sections are shown mounted upon the cowl segment B in Figure 1. This is so because the cowl segments are usually of appreciable angular extent, and the flaps must be of sufficiently short chord to permit them to hinge readily about a chordwise axis. This axis for an individual flap 8 is shown at 80 in Figures 7 and 8, and it is mounted upon a fitting 81 carried by an encircling marginal flange 98 of the cowl segment. Mounted in position to engage cooperatively with the hinge at 80 is a slot 82 in the fitting 83, carried just beneath the forward edge of the flap 8, and opening forwardly or towards the cowl proper. The fitting 83 is provided with a surface 84, arranged on the arc of a circle about the hinge axis at 80, when the parts are engaged, and the fitting 81 is provided with a similarly curved recess 85, also arranged on the same circle about the hinge axis at 8. By raising the flap or swinging it outwardly beyond its normal limit of outward swing, the notch 82 may be engaged with the hinge pin 80, whereupon by swinging it inwardly the surface 84 is in effect locked by its engagement with the surface 85, and the notch 82 may not then be withdrawn from the hinge pin 80. Withdrawal is only possible by swinging the flap 8 outwardly beyond its normal limit of swing, and this is prevented so long as its actuator 7 is engaged with the trailing or swinging edge of the flap to prevent its swinging so far outwardly.

The actuator 7 must have some arcuate movement, and to that end is hingedly mounted at 70 upon the inner cowling C'. By known mechanism, indicated at 71, its outer part 7 is extensible and contractible with respect to its inner portion 72. At its outer end it is provided with a pin 73 directed chordwise of the ring cowl, which is engageable within the notch 86 of a fitting 87, which is secured just beneath the trailing edge of the flap 8.

A latch 74, pivoted at 75 and spring-urged into locking position, has a notch 76, which, cooperating with the notch 86, completely encircles and secures the pin 73 against removal, and constitutes a pivot for that pin. The button-like end of the lever 74, which is indicated at 77, projects within an aperture in the skin of the flap 8, and lies flush therewith, except as it is depressed into released position, as shown in dot-dash lines in Figure 7.

To remove each flap it is only necessary to press inwardly the head 77 of the release lever 74, to separate the notches 76 and 86, whereupon the pin 73 may be withdrawn from the notch 86. Now the flap is free to swing outwardly beyond its normal limit of swing, and in so doing the locking engagement between the surfaces 84 and 85 is broken, and the fitting 83 can be removed from the pin 80. This is a simple arrangement with each flap, and does not disturb subsequent reengagement in the same operative relation of each with its actuator. Furthermore, if it is preferred to do so, the cowl segments may be dismounted without more than releasing each actuator 7 from its flap 8. In other words, the flaps 8 may, if desired, be left secured to the cowl segment when the latter is removed or dismounted.

I claim as my invention:

1. A ring cowling for aircraft divided longitudinally into a plurality of complemental, individually form-sustaining segments, and for mounting upon at least two fixed supports for each segment, all located interiorly of the ring cowling in position for engagement each with its own segment alone, cooperating quick-releasable securing means carried by each segment and engageable with the corresponding fixed supports to resist axial movement of each individual segment, to restrain circumferential movement of each segment, and to restrain radial movement of each segment, relative, in all cases, to the engine but not relative to the other segments, and quick-releasable securing means upon the several segments, interengageable directly between the segments across their longitudinal junctures but independently of the supports, to mutually resist radial movement and to reinforce each the others in opposing axial and circumferential movement.

2. The combination of claim 1, wherein the connecting means include a hook upon one segment, a hook engageable therewith and carried by the adjoining segment, means acting upon one such hook to draw it, relatively to its mounting segment, transversely away from the other hook, and an actuator movable so to move said movable hook.

3. The combination of claim 1, wherein the connecting means include a hook upon one segment, a hook engageable therewith and carried by the adjoining segment, means acting upon one such hook to draw it, relatively to its mounting segment, transversely away from the other hook, and an actuator movable so to move said movable hook, each segment having a notch in its skin registering with the notch in the opposite segment, and the actuator being formed to substantially fill both notches, and thereby to key together the segments against relative movement in the axial sense, when the hooks are in interengaged relationship.

4. The combination of claim 1, wherein the connecting means include a hook upon one segment, a hook carried by the adjoining segment, a cam means for drawing the latter hook away from the former for engagement, and vice versa, and a cam actuator formed to lie flush with and as a part of the skin of its cowl segment, when parts are fully interengaged.

5. The combination of claim 1, wherein the connecting means include a hook upon one segment, a hooked arm upon the other segment, eccentric means to draw said hooked arm, when engaged with the hook, laterally away from the latter, and vice versa, a cam actuator for operating said eccentric means, and stop means engageable between said actuator and the hooked arm to raise the latter from engagement with the hook as parts approach full-released positions.

6. The combination of claim 1, wherein one of the segment supports for each of a plurality of segments comprises a radially directed pintle carried by a fixed support, a T head carried by said pintle, a rotatable socket member on the interior of the cowl segment formed to receive said pintle and notched to receive said T head, in one position, and when rotated from such position embracing said T head and preventing withdrawal of said pintle, and means to retain said rotatable socket member against accidental rotation back to pintle-receiving and -releasing position.

7. The combination of claim 1, wherein one of the segment supports for each of a plurality of segments comprises a hooked pin axially directed and mounted upon a fixed support, a complementally hooked pin carried by the cowl segment, and a sleeve axially slidable on one such pin, and yieldably biased to remain in position shrouding the two interengaged hooks.

8. The combination of claim 1, wherein one segment extends transversely at the bottom of the ring cowling, and wherein the supports for said segment comprise two rearwardly and downwardly directed hooks carried by the segment at opposite sides of a vertical axial plane through the ring cowling, and two sockets carried by the fixed supports to receive said hooks, and arranged to restrain circumferential movement of said segment, and to support the segment pendent from a fixed support when such segment is not otherwise supported from adjoining segments.

9. In a removable ring cowling for aircraft, in combination, two hook sockets forwardly facing adjacent the lower portion of the ring cowling, constituting part of fixed supporting means, and located at opposite sides of the ring cowling's vertical axial plane, a lower cowl segment having two rearwardly and downwardly directed hooks located to engage within said sockets, and thereby to support the lower segment in pendent position from such fixed supporting means, lateral cowl segments completing the ring cowling, each formed with a radially directed socket, a radially directed pintle constituting part of the fixed supporting means, located in position to fit within each such radial socket, a further two-part mounting means carried, one part by the fixed supporting means and the other part by each segment, spaced from said radial socket, and interengageable to steady its segment in conjunction with the pintle, and complemental quick-releasable means on the several segments circumferentially constrictive across each junction between segments, to retain the several segments, and the cowling as a whole, against radial movement, while supported by the several fixed supports against axial and circumferential movement.

10. A removable ring cowling for aircraft, comprising a lower segment and a plurality of complemental segments, releasable means for mounting said lower segment from a fixed supporting means located within the ring cowling, to hang downwardly when otherwise unsupported, a radially directed supporting member and an axially directed supporting member carried by the fixed supporting means in position to engage each such complemental segment, cooperating means carried by each of the latter and arranged for interlocking engagement with said fixedly mounted supporting means to resist rotational and axial movement relative to the fixed supporting means, and circumferentially constrictive means interengageable across each junction between segments, to secure each segment, and the cowl as a whole, against radial movement relative to the fixed supporting means.

11. In combination with a fixed, interiorly located supporting means, a removable ring cowling for aircraft surrounding said supporting means, comprising a lower and two lateral segments, a plurality of constrictive means disposed at the longitudinal meeting edges of said segments, interconnecting the latter and urging them towards one another radially and circumferentially, and two two-part means angularly spaced, for the support of each cowl segment, one part of each being carried upon the cowling and the other part constituting part of said supporting means, and the several two-part means being relatively cooperatively arranged, when operatively engaged, to prevent axial, circumferential and radial movement of the cowl segments.

12. In combination with a fixed supporting means, a removable ring cowling for aircraft surrounding said supporting means, comprising a lower segment and a plurality of complemental segments, releasable means for mounting said lower segment upon said fixed supporting means to swing downwardly when otherwise unsupported, a plurality of two-part means, of which one part constitutes part of said fixed supporting means and the other part is carried by each complemental segment, interengageable to secure each such complemental segment individually against circumferential and axial movement, and circumferentially constrictive means spanning each junction between adjoining segments, carried upon one such segment and engageable with complemental means upon the adjoining segment, to secure the ring cowl as a whole against radial movement and to support the lower segment in upswung operative position.

13. In combination with a fixed supporting means, a ring cowling for aircraft formed of a plurality of complemental cowl segments, quickly releasable means to mount each segment from the fixed supporting means, independently of the others, to resist circumferential and axial movement, cooperating constrictive elements carried by the several segments, arranged for quick-releasable interengagement across each junction between adjoining segments, to secure the individual segments and the cowl as a whole against radial movement, a plurality of complemental flap sections hingedly mounted at the trailing edge of the individual sections of the cowling, an actuator rod movable generally radially outwardly from within the cowling, corresponding to and connected to each flap section to swing the same inwardly and outwardly, and quick-releasable means for operatively engaging each actuator with its flap section, for removal of the latter with its individual cowl segment.

14. In a ring cowling for aircraft, a plurality of complemental cowl segments, quick-releasable means for joining and mounting the segments in circumferential disposition, flap sections each mounted upon the trailing edge of a cowl segment to pivot about a chordwise axis, an actuator for each flap, and quick-releasable means to disengage each actuator from its flap.

15. In a ring cowling for aircraft, a plurality of complemental individual cowl segments, quick-releasable means for joining and mounting the segments in circumferential disposition, flap sections each mounted upon the trailing edge of a cowl segment to pivot about a chordwise axis, an actuator for each flap, quick-releasable means to disengage each actuator from its flap, for manipulation of such flap with its segment upon release of such segment from the ring cowl as a whole, and quick-releasable means to pivotally mount each flap upon its cowl segment.

16. A ring cowl as in claim 14, each flap pivot mount including a fitting upon the segment having a pivot pin and a surface arcuate about the pivot axis, a complemental fitting notched to receive said pivot pin and having a surface arcuate about the pivot axis, and engageable with the first-mentioned arcuate surface throughout the operative range of pivoting of the flap, to prevent disengagement of the notch from the pivot pin, but disengageable by swinging of the flap beyond such operative range, and the actuator, while engaged with the flap, preventing swinging of the flap beyond its operative range, but permitting such swinging when disengaged from the flap.

17. In combination with fixed supporting means individual to each of a plurality of ring cowl segments, and located interiorly of the ring cowling, a ring cowling for aircraft divided longitudinally into a plurality of individually separable but complemental segments, and for mounting each individually upon its corresponding ones of said fixed supporting means, each segment including a skin and integral contour-defining bracing and air-directing means interiorly disposed, cooperating quick-releasable securing means carried by each segment and engageable with its individual fixed supporting means to support selected segments thereon in operative position independently of all other segments, to restrain circumferential and axial movement of each such segment, and to effect primary support of all segments, and quick-releasable means upon the several segments interengageable across each junction between segments to mutually resist radial movement of the segments and to join them as a unit immovable, except for vibrational movement, relative to the supporting means.

18. A ring cowling as in claim 17, including a plurality of flaps pivoted chordwise upon the trailing edge of segments of the ring cowling, for swinging by actuators connected to their swinging edges, a quick-releasable pivot connection between each flap and its mounting segment, and a quick-releasable connection between each flap and its actuator.

19. In combination, a ring cowling for aircraft, for mounting in operative position relative to an engine, said ring cowling being divided longitudinally into a plurality of complemental segments, at least two fixed supports individual to each segment, all located interiorly of the ring cowling in position for engagement each with its own segment alone, cooperating quick-releasable securing means carried, respectively, by each segment and by that segment's supports, and interengageable directly to resist axial movement of each segment, and to restrain circumferential movement of each segment, relative, in all cases, to that segment's fixed support but not relative to the other segments or their supports, and quick-releasable securing means upon the several segments, adjacent their longitudinal edges, interengageable directly between the segments across their longitudinal junctures, but independently of their respective supports, to join each segment with the others for mutual support and to mutually resist radial movement and to reinforce each the others' support in opposition to axial and circumferential movement.

20. The combination of claim 19, characterized in that the last-mentioned securing means include elements constrictive by their interengagement to draw the segments closely together along their longitudinal junctures, and to crowd the ring cowl as a whole radially inwardly relative to the interiorly located supports.

ROY H. ANDERSON.

REFERENCES CITED

The following references are of record in the file of this patent:

UNITED STATES PATENTS

| Number | Name | Date |
|---|---|---|
| 1,933,966 | Chilton | Nov. 7, 1933 |
| 1,943,528 | Hicks | Jan. 16, 1934 |
| 2,047,948 | Breene et al. | July 21, 1936 |
| 2,067,041 | Beisel | Jan. 5, 1937 |
| 2,129,826 | Dintilhac | Sept. 13, 1938 |
| 2,178,998 | Scott | Nov. 7, 1939 |
| 2,319,463 | Lear | May 18, 1943 |